(12) United States Patent
Kawase et al.

(10) Patent No.: US 11,321,038 B2
(45) Date of Patent: May 3, 2022

(54) DISPLAY CONTROL DEVICE AND NON-TRANSITORY COMPUTER READABLE MEDIUM STORING DISPLAY CONTROL PROGRAM FOR SETTING DISPLAY TIME ACCORDING TO DISPLAY PRIORITY

(71) Applicant: FUJIFILM Business Innovation Corp., Tokyo (JP)

(72) Inventors: Fumiyoshi Kawase, Kanagawa (JP); Takashi Sakamoto, Kanagawa (JP); Masaharu Shimojima, Kanagawa (JP); Tsukasa Tsushima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 126 days.

(21) Appl. No.: 16/565,509

(22) Filed: Sep. 10, 2019

(65) Prior Publication Data
US 2020/0097238 A1  Mar. 26, 2020

(30) Foreign Application Priority Data

Sep. 21, 2018 (JP) .............................. JP2018-177310

(51) Int. Cl.
*G06F 3/14* (2006.01)
*H04N 1/00* (2006.01)
*G09F 9/00* (2006.01)

(52) U.S. Cl.
CPC ........... *G06F 3/14* (2013.01); *H04N 1/00129* (2013.01); *G09F 9/00* (2013.01)

(58) Field of Classification Search
CPC ....................................................... G06F 3/14
See application file for complete search history.

(56) References Cited

U.S. PATENT DOCUMENTS

| 9,888,133 | B2 | 2/2018 | Kida | |
| 2002/0186212 | A1* | 12/2002 | Matsumoto | H04N 21/42221 345/204 |
| 2009/0051826 | A1* | 2/2009 | Chang | G11B 27/105 348/744 |

FOREIGN PATENT DOCUMENTS

JP  2016-096510  5/2016

* cited by examiner

*Primary Examiner* — Jeffery A Brier
(74) *Attorney, Agent, or Firm* — JCIPRNET

(57) ABSTRACT

A display control device includes an acquisition unit that acquires an image, a storage unit that stores plural images acquired by the acquisition unit, and a display control unit that controls each image stored in the storage unit to be displayed sequentially on a display device during a fixed time, and performs control of changing a time for which each of an acquired new image and the plural images stored in the storage unit is displayed on the display device according to a display priority of each image in a case where the acquisition unit acquires the image.

13 Claims, 16 Drawing Sheets

| IMAGE ID | PRIORITY | DISPLAY TIME |
|----------|----------|--------------|
|   710    |   720    |     730      |

700

DISPLAY CONTROL DEVICE AND NON-TRANSITORY COMPUTER READABLE MEDIUM STORING DISPLAY CONTROL PROGRAM FOR SETTING DISPLAY TIME ACCORDING TO DISPLAY PRIORITY

CROSS-REFERENCE TO RELATED APPLICATIONS

This application is based on and claims priority under 35 USC 119 from Japanese Patent Application No. 2018-177310 filed Sep. 21, 2018.

BACKGROUND

(i) Technical Field

The present invention relates to a display control device and a non-transitory computer readable medium storing a display control program.

(ii) Related Art

JP2016-096510A discloses an image forming apparatus which makes it possible setting a method in which, in a case where there are a plurality of pieces of display target image data, the plurality of pieces of image data are displayed on a digital signage apparatus with a simple operation, and includes an image reading unit, a storage unit, a communication unit, a reception unit, and an operation control unit, in which the storage unit has a storage region for a signage correlated with a digital signage apparatus on a one-to-one basis, a plurality of pieces of image data generated by the image reading unit reading a document placed on a platen, and setting data indicating a display setting regarding a display aspect in which the digital signage apparatus displays a plurality of pieces of image data are stored in the storage region for a signage, and the operation control unit transmits the plurality of pieces of image data and the setting data stored in the storage region for a signage to the digital signage apparatus.

SUMMARY

In a digital signage apparatus in which each of a plurality of registered images is displayed sequentially during a fixed time, in a case where an image to be displayed is added, a display time of an image displayed hitherto is shorter than before the image is added due to an increase of the number of registered images. However, there is an image having a high display priority, and thus there is a case where it is not preferable to uniquely shorten a display time of each image. This is because, in a case where a display time of an image is shortened, the visibility of the image is reduced.

Aspects of non-limiting embodiments of the present disclosure relate to a display control device and a non-transitory computer readable medium storing a display control program capable of setting a display time according to a display priority even though the number of images to be displayed is increased in a case where a plurality of images are displayed sequentially during a fixed time.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a display control device including an acquisition unit that acquires an image; a storage unit that stores a plurality of images acquired by the acquisition unit; and a display control unit that controls each image stored in the storage unit to be displayed sequentially on a display device during a fixed time, and performs control of changing a time for which each of an acquired new image and the plurality of images stored in the storage unit is displayed on the display device according to a display priority of each image in a case where the acquisition unit acquires the image.

BRIEF DESCRIPTION OF THE DRAWINGS

Exemplary embodiment(s) of the present invention will be described in detail based on the following figures, wherein.

DETAILED DESCRIPTION

Hereinafter, with reference to the drawings, a description will be made of an exemplary embodiment for realizing the invention.

Figure 1:
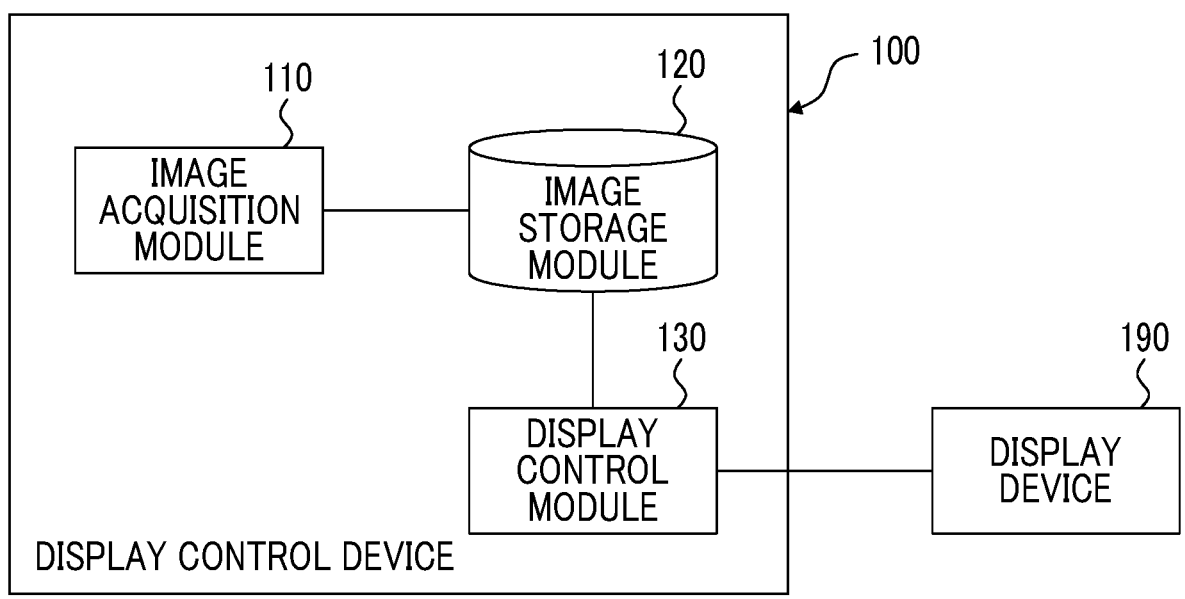
FIG. 1 is a conceptual module configuration diagram illustrating a configuration example according to the present exemplary embodiment.

FIG. 1 is a conceptual module configuration diagram illustrating a configuration example according to the present exemplary embodiment.

The module generally indicates components such as software (computer program) or hardware which can be logically divided. Therefore, the module in the present exemplary embodiment indicates not only a module in a computer program but also a module in a hardware configuration. Therefore, in the present exemplary embodiment, a description will also be made of a computer program (a program causing a computer to execute each procedure, a program causing a computer to function as each unit, or a program a computer to realize each function), a system, and a method for functioning as such a module. However, for convenience of description, "storing", "being stored", or words equivalent thereto are used, but, these words indicate that a storage device stores data or a storage device is controlled to store data in a case where an exemplary embodiment is a computer program. A module may correspond to a function on a one-to-one basis, and, in installation, a single module may be configured with a single program, a plurality of modules maybe configured with a single program, and, conversely, a single module may be configured with a plurality of programs. A plurality of modules may be executed by a single computer, and a single module may be executed by a plurality of computers in a distributed or parallel environment. Other modules may be included in a single module. Hereinafter, the term "connection" indicates only physical connection but also logical connection (transmission and reception of data, indication, a reference relationship between pieces of data, login, and the like). The term "setting in advance" indicates that setting is performed prior to a target process, and indicates not only that setting is performed before a process according to the present exemplary embodiment is started but also that, even after a process according to the present exemplary embodiment is started, setting is performed depending on a situation or a state at the time or a situation or a state hitherto in a case where a target process is not performed. In a case where there are "a plurality of preset values", the values maybe different from each other, and two or more values may be the same as each other (of course, including all of the values). The description that "in a case of A, B is performed" indicates that "it is determined whether or not A is satisfied, and, in a case where it is determined that A is satisfied, B is performed". However, this excludes a case where determination of whether or not A is satisfied is unnecessary. In a case where objects are listed such as "A, B, and C", the objects are exemplarily listed unless in other cases mentioned, and a case where only one thereof (for example, only A) is selected is included.

A system or an apparatus also includes not only a case where a plurality of computers, pieces of hardware, and apparatuses are configured to be connected to each other via communication means such as a network (including communication connection on a one-to-one basis) but also a case of being configured with a single computer, a single piece of hardware, and a single apparatus. The "apparatus" and the "system" are used as terms having an identical meaning. Of course, the "system" does not include systems that are merely a social "mechanism" (social system) which is an artificial arrangement.

Target information is read from a storage device, the process is performed, and a process result is written to the storage device for each process performed by each module or for each process in a case where a plurality of processes are performed in a module. Therefore, description of reading for a storage device before a process and writing for the storage device after the process will be omitted. The storage device here may include a hard disk, a random access memory (RAM), an external storage medium, a storage device connected via a communication line, a register in a central processing unit (CPU), or the like.

A display control device 100 according to the present exemplary embodiment controls display of an image on a display device 190, and includes an image acquisition module 110, an image storage module 120, and a display control module 130 as illustrated in the example in FIG. 1.

The display device 190 is connected to the display control module 130 of the display control device 100. As the display device 190, for example, there is a display device of a digital signage apparatus used for an advertisement, a notification, or the like. The display control device may be mounted in the digital signage apparatus, and may be mounted in an apparatus which externally controls the digital signage apparatus.

The image acquisition module 110 is connected to the image storage module 120. The image acquisition module 110 acquires an image, and stores the image in the image storage module 120. Acquiring an image includes, for example, reading the image with a scanner or a camera, receiving the image from an external apparatus with a facsimile via a communication line, and reading the image stored in a storage device such as a hard disk (which is built into a computer, but includes a storage device connected to the computer via a network). The image may be a multi-value image (including a color image), and may be a binary image. The number of images to be received may be one, and may be plural. A content of an image may be a pamphlet for advertisement, a document used for business, or the like.

The image storage module 120 is connected to the image acquisition module 110 and the display control module 130. The image storage module 120 stores an image acquired by the image acquisition module 110. The image storage module 120 stores a plurality of images. An image stored in the image storage module 120 is a display target on the display device 190. The whole region of a storage device (a recording medium such as a hard disk or a USB memory) may be the image storage module 120, and a predefined storage region (for example, a partition, a folder, or a directory) in the storage device may be the image storage module 120.

The display control module 130 is connected to the image storage module 120 and the display device 190. The display control module 130 performs control such that each image stored in the image storage module 120 is displayed sequentially on the display device 190 during a fixed time.

In a case where the image acquisition module 110 acquires an image, the display control module 130 performs control of changing a time for which each of the acquired new image and a plurality of images stored in the image storage module 120 is displayed on the display device 190, according to a display priority of each image.

Here, the phrase "sequential display during a fixed time" indicates that images registered in the image storage module 120 are displayed sequentially during a predefined time with the predefined time (for example, 60 minutes) as one cycle. The "sequential display" is performed regardless of a length of a time for which each image is displayed. The "sequential display" may include that a display time is set to 0 (that is, an image is not displayed). Conversely, the "sequential display" may include that a display time is a fixed time (only a single image is displayed). An image may be displayed any number of times during a fixed time. For example, in a case where a display time included in a fixed time is 10 minutes, an image may be continuously displayed for ten minutes, and may be displayed ten times every minute.

The phrase "changing a display time" includes increasing or decreasing (reducing) a display time of a target image.

In a case where the image acquisition module 110 acquires an image, the display control module 130 may perform control such that an image having a high priority is displayed on the display device 190 for a time which is not shorter than an average display time after the new image is acquired.

Here, the "priority" indicates the degree to which an image is desired to be displayed on the display device 190. For example, the priority is determined on the basis of, for example, the image registration date and time, a user having registered the image, the type of image (for example, a notification document or an advertisement), information indicating the importance, a size of a character included in the image, the number of characters, the presence or absence of a color image, text included in the image, and information included in the image, such as a deadline.

The "image having a high priority" is an image having a priority which is equal to or higher than a predefined priority, or is an image having a rank which is equal to or higher than a predefined rank in ranks sorted according to a priority.

The "average display time after the new image is acquired" is obtained by simply dividing a fixed time (a time for which respective images are displayed sequentially, that is, a time of one cycle) by the number of images after the new image is acquired. For example, in a case where one cycle is 60 minutes, and the number of images after a new image is acquired is six, an average display time is 10 minutes.

The display control module 130 may perform control such that an image having a high priority is displayed on the display device 190 for a time which is not shorter than a display time before a new image is acquired.

The "time which is not shorter than a display time before a new image is acquired" includes a time which is equal to the previous display time and a time which is longer than the previous display time.

For example, in a case where a display time of an image having a high priority is 10 minutes, the image is displayed for a time which is not shorter than 10 minutes even though a new display image is acquired. However, "an image is required to have a high priority" even after a display image is acquired. For example, an image A is an image having a high priority before a new display image is acquired, but, in a case where the priority of the acquired new image is higher than the priority of the image A, the image A may not be an image having a high priority.

The display control module 130 may perform control such that an image having a high priority is displayed on the display device 190 up to a display time of one cycle for which respective images are displayed sequentially.

For example, in a case where there are a plurality of (for example, six) display target images, but there is only one image having a high priority, only the image having a high priority is displayed during a fixed time (60 minutes in the above-described example). In this case, as a display aspect, for example, the image having a high priority may be displayed for 60 minutes, then information having no relation to a registered image may be displayed for one minute, and then the image having a high priority may be displayed for 60 minutes again.

In a case where the image acquisition module 110 acquires an image, the display control module 130 may perform control such that an image having a low priority is displayed on the display device 190 fora time which is not longer than a display time before the new image is acquired.

The "image having a low priority" is an image having a priority which is equal to or lower than a predefined priority, or is an image having a rank which is equal to or lower than a predefined rank in ranks sorted according to a priority. For example, in a case where a priority has three levels such as "high", "medium", and "low", and a predefined priority is assumed to be a "high" priority, not only an image having a "low" priority but also an image having a "medium" priority is an "image having a low priority".

For example, the number of display target images is five, all of priorities of the five images are "low" priorities, and one cycle is 60 minutes, a display time of each image is 12 minutes. In a case where a single image having a "high" priority is acquired, a display time of each of the five images having the "low" priorities is reduced to 9 minutes, and 15 minutes corresponding to the rest time is allocated to a display time of the image having the "high" priority. In other words, a display time of the image having a "low" priority is reduced from 12 minutes to 9 minutes, that is, a display time is set to a time "which is not longer than a display time before a new image is acquired" (or a time which is shorter than the display time before the new image is acquired). Regarding a method of reducing a display time, a predefined value (positive numerical value) may be subtracted from the display time, the display time may be divided by a predefined value (a numerical value greater than 1), and a user may select a reduced display time. In a case where the user selects a reduced display time, a user interface which can reduce only a display time of an image having a low priority may be used.

For example, in a case where the number of a display target images is five, one image among the images has a "medium" priority, the other four images have a "low" priority, and one cycle is 60 minutes, it is assumed that a display time of the image having a "medium" priority is 14 minutes, and a display time of each of the images having a "low" priority is 11 minutes 30 seconds. In a case where a single image having a "high" priority is acquired, a display time of the image having a "medium" priority is reduced to 11 minutes, a display time of each of the four images having a "low" priority is reduced to 9 minutes 15 seconds, and 12 minutes corresponding to the rest time is allocated to a display time of the image having a "high" priority. In other words, a display time of the image having a "medium" priority (in this case, the "medium" priority is lower than a "high" priority, and the image having a "medium" priority corresponds to an "image having a low priority") is reduced to 14 minutes to 11 minutes, and a display time of the image having a "low" priority is reduced from 11 minutes 30 seconds to 9 minutes 15 seconds, that is, a display time is set to a time "which is not longer than a display time before a new image is acquired" (or a time which is shorter than the display time before the new image is acquired).

The two examples are also an example in which, "in a case where the image acquisition module 110 acquires an image, an image having a high priority is displayed for a time which is not shorter than an average display time after the new image is acquired".

The display control module 130 may perform control such that an image having a low priority is displayed on the display device 190 fora time which is not longer than an average display time after a new image is acquired. This corresponds to the above-described case where control is performed such that an image having a high priority is displayed on the display device 190 for a time which is not shorter than an average display time after a new image is acquired.

Control on a time for which an image is displayed on the display device 190 by the display control module 130 may include control of not displaying an image.

Here, the "control of not displaying an image" includes that a time for which the image is displayed on the display device 190 is set to 0.

In a case where the number of images stored in the image storage module 120 is equal to or larger than a predefined number, the display control module 130 may perform control of changing a time for which each of an acquired new image and a plurality of images stored in the image storage module 120 is displayed on the display device 190, according to a display priority of each image.

Here, the "images stored in the image storage module 120" indicate images as targets displayed on the display device 190.

The "number of images stored in the image storage module 120" is the number of images after a new image is acquired, but may be the number of images before the new image is acquired.

The display control module 130 may perform control of reducing a display time of the number of images exceeding a predefined number according to a display priority of each image. For example, in a case where the predefined number is ten, and the number of display target images is twelve, display times of two images are reduced. The phrase "reducing a display time" indicates that, in a case of an image which has been displayed already, the display time is reduced compared with the previous display time of the image, and, in a case of an acquired new image (there is no previous display time), the display time is reduced (short) compared with an average display time in the number of display target images.

The display control module 130 may perform control of not displaying images of the number exceeding a predefined number according to a display priority of each image. In other words, as an example of "reducing a display time", a display time is controlled to be set to 0.

In a case where the image acquisition module 110 acquires an image, the display control module 130 may display the acquired new image and a plurality of images stored in the image storage module 120 in separate regions according to a display priority of each image.

For example, in a case where there is a difference in a priority (a value of a priority is divided into at least two groups), control is performed such that a display region is divided, and, in a case where there is no difference in a priority (a value of a priority is the same for all images), control is performed such that a display region is not divided.

The display control module 130 may determine a size of a region in which an image is displayed according to a display priority of each image. Generally, a large display region is allocated to an image having a high priority, and a small display region is allocated to an image having a low priority.

The display control module 130 may control the number of division regions displayed in a display region according to a display priority of each image.

For example, in a case where a priority has two levels (for example, a "high" priority and a "low" priority), a screen is divided into two regions (the screen is divided into two regions having different sizes, and an image having a high priority is displayed in a larger region), in a case where a priority has three levels (for example, a "high" priority, a "medium" priority, and a "low" priority), a screen is divided into three regions (the screen is divided into three regions having different sizes, and an image having a higher priority is displayed in a larger region), and in a case where a priority has four levels (for example, priorities of 1 to 4), a screen is divided into four regions (the screen is divided into four regions having different sizes, and an image having a higher priority is displayed in a larger region).

The display control module 130 may perform control such that an image of which the acquisition date and time is included in a predefined period from the current date and time is displayed for a time which is not shorter than the previous display time.

A display time of an acquired new image (a new display target image) is set not to be reduced. As a result, a display time of an old image (an image which has been displayed already for a long time) is reduced.

The display control module 130 may perform control such that an image of which the acquisition date and time is not included in a predefined period from the current date and time is displayed for a time which is shorter than the previous display time. As described above, a display time of an old image is reduced.

The display control module 130 may perform control such that an image of which the acquisition date and time is not included in a predefined period from the current date and time is not displayed. In other words, as an example of "reducing a display time", a display time is controlled to be 0.

A process of the display control module 130 may be performed as follows.

(1)

Control maybe performed such that an image is displayed on the display device 190 for a time which is not longer than a display time before an image is acquired according to a user having registered an image.

For example, in a case of an image of a document which a user causes a predefined person (for example, a general user or a guest user) to read, a display time thereof may be shorter than a display time before a new image is acquired.

Conversely, control may be performed such that an image is displayed on the display device 190 for a time which is not shorter than a display time before an image is acquired according to a user having registered an image.

For example, in a case of an image of a document which a user causes a predefined person (for example, a manager or a user as advertiser paying a high advertisement charge (an advertisement charge which is equal to or higher than a predefined amount)) to read, a display time thereof may be shorter than a display time before a new image is acquired.

(2)

In a case where a character recognition process is performed on an acquired image, and extracted characters include a predefined character, control may be performed such that an image is displayed on the display device 190 for a time which is not shorter than a display time before an image is acquired.

For example, even though a new image is acquired, in a case where an image of a document on which text such as "important" or "influenza" is printed is a display target, a display time of the document is set not to be reduced.

A priority may be determined on the basis of (A) a size of a character (for example, an image including a character having a size larger than a predefined size has a high priority), (B) a color of a character (for example, an image including a red character has a high priority), (C) the number of characters (for example, an image including characters of a number larger than a predefined number has a high priority), and (D) an area of a picture (for example, an image including a picture with an area larger than a predefined area has a high priority, or an area proportion may be used), in a document.

(3)

Conversely, control may be performed such that an image is displayed on the display device 190 for a time which is not shorter than a display time before an image is acquired according to the type of image.

For example, in a case where the type of image is an image of a notification document, a display time of the image of the document is set not to be reduced.

(4)

In addition to a display time, a display interval or a display order may be changed according to a priority.

Figure 2A:
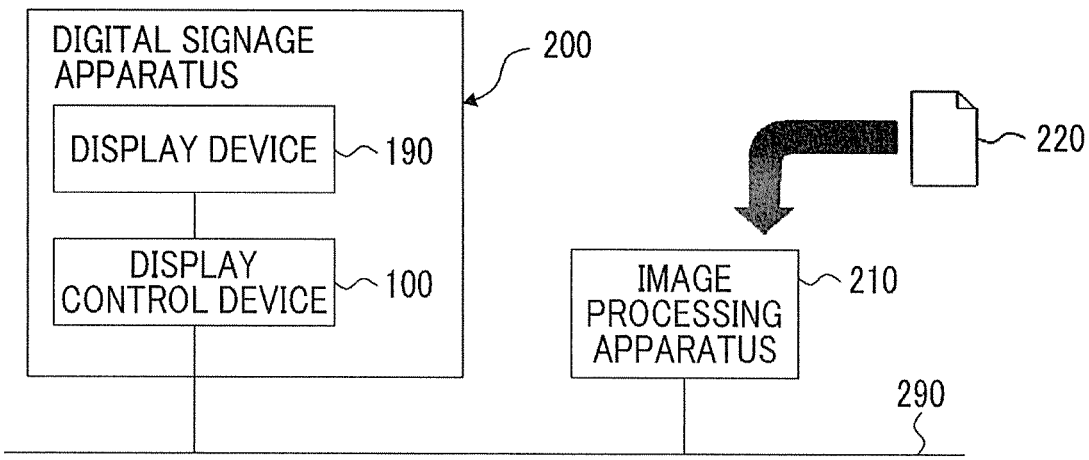
FIGS. 2A and 2B are diagrams illustrating system configuration examples using the present exemplary embodiment.
Figure 2B:
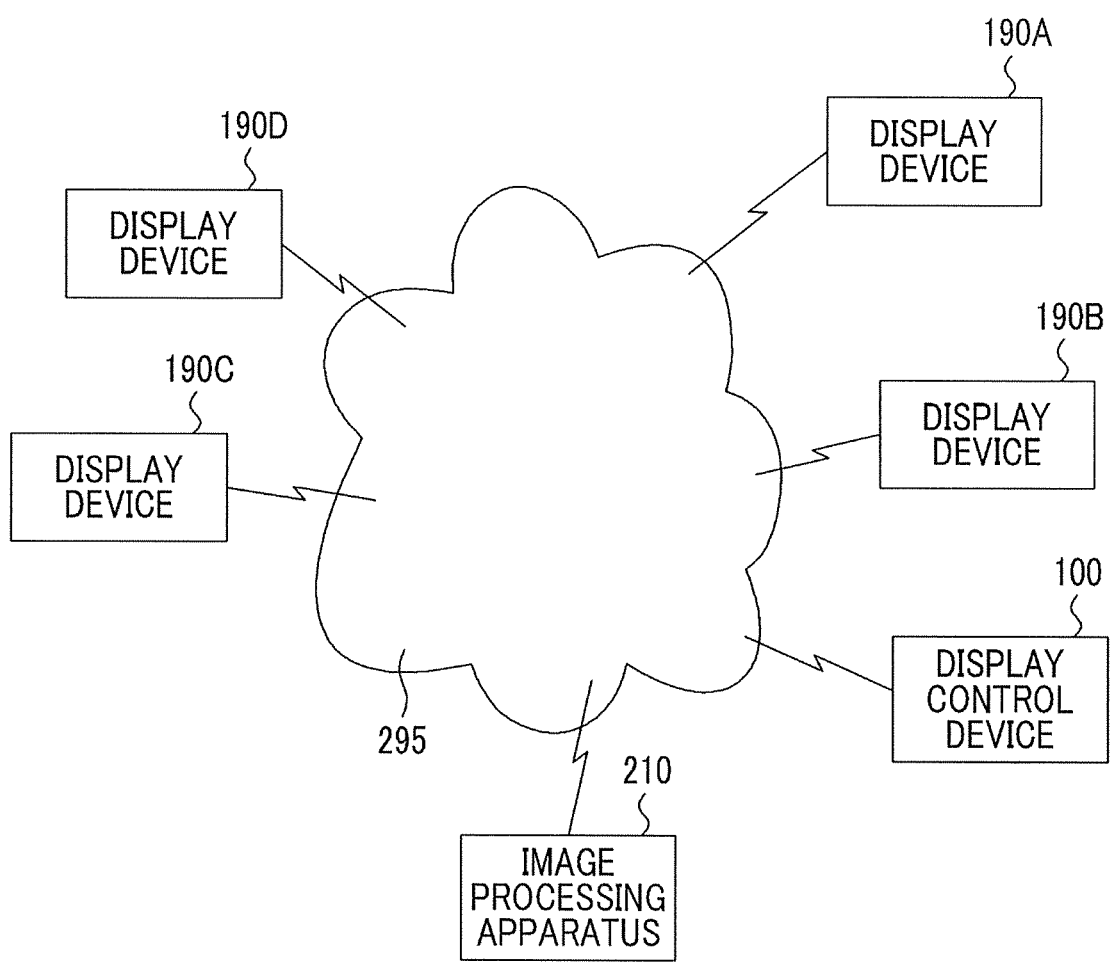

FIGS. 2A and 2B are diagrams illustrating system configuration examples using the present exemplary embodiment.

A system illustrated in FIG. 2A shows an example in which the display control device 100 is provided in a digital signage apparatus 200. The digital signage apparatus 200 includes the display control device 100 and the display device 190. The digital signage apparatus 200 displays an image by using a display (for example, a flat display or a curved display).

An image processing apparatus 210 is connected to the display control device 100 of the digital signage apparatus 200 via a communication line 290. The image processing apparatus 210 may have at least a scanner function, and is, for example, a multi-function peripheral (an image processing apparatus having two or more functions of a scanner, a printer, a copier, and a facsimile). The communication line 290 may be a wired line, a wireless line, or a combination thereof, and may be, for example, the Internet or an intranet as a communication infrastructure. The digital signage apparatus 200 may display an image, and may also output sounds (including music) from a speaker.

The image processing apparatus 210 reads a document 220, and the image processing apparatus 210 transmits an image (a so-called contribution image) of the document 220 to the digital signage apparatus 200 (that is, the display control device 100). The display control device 100 displays the image on a display.

The digital signage apparatus 200 may include a reading module which reads an image from an original document. In other words, the image processing apparatus 210 may be incorporated into the digital signage apparatus 200 (of course, the digital signage apparatus 200 may be incorporated into the image processing apparatus 210). The image acquisition module 110 acquires the image read by the reading module.

A system illustrated in FIG. 2B shows a system example in which the display control device 100 controls a plurality of display devices 190.

The display control device 100, a display device 190A, a display device 190B, a display device 190C, a display device 190D, and the image processing apparatus 210 are connected to each other via a communication line 295. The communication line 295 may be a wired line, a wireless line, or a combination thereof, and may be, for example, the Internet or an intranet as a communication infrastructure. The function of the display control device 100 may be realized by using a cloud service.

The image processing apparatus 210 reads the document 220, and the image processing apparatus 210 transmits an image of the document 220 to the display control device 100. The display control device 100 displays the image on a display of each display device 190 (which may be a predefined display device 190).

As a specific example, the following process may be performed.

(1) A state is assumed in which 60 minutes are set as one cycle, and five images are registered in the image storage module 120. In this case, a display time of each image is 12 minutes in 60 minutes of one cycle.

(2) Here, it is assumed that a single display target image is added to the image storage module 120.

(3.0) Generally (in a case of not using the present exemplary embodiment), six images are displayed in one cycle, and thus a display time of each image after the new image is acquired is 10 minutes. In other words, in a case where the number of registered images increases, the degree of delivery of information is uniformly reduced.

(3.1) Therefore, in the present embodiment, the following process is performed.

(3.1.1) For example, in a case where, among six images, there are two images having a high priority, and four images having a low priority, display times of the images are respectively 12 minutes, 12 minutes, 9 minutes, 9 minutes, 9 minutes, and 9 minutes. The display times are calculated as follows.

A display time of each of the two images having a high priority is still set to 12 minutes which is a display time before the image is acquired. In other words, the display time is not shorter than a display time before a new image is acquired.

With respect to the four images having a low priority, a display time of each image is calculated according to the following computation.

(60−12×2)/4=9 (minutes)

(3.1.2) For example, in a case where, among the six images, there is a single image having a high priority, and there is a single image having a medium priority, display times of the images are respectively 12 minutes, 10 minutes, 9 minutes 30 seconds, 9 minutes 30 seconds, 9 minutes 30 seconds, and 9 minutes 30 seconds. The display times are calculated as follows.

A display time of the image having a medium priority is set to 10 minutes which is an average display time in a case of six images. In other words, the display time is set not to be shorter than an average display time after a new image is acquired. A display time of the single image having a high priority is still set to 12 minutes which is a display time before the image is acquired. In other words, the display time is not shorter than a display time before a new image is acquired.

With respect to the four images having a low priority, a display time of each image is calculated according to the following computation.

(60−12−10)/4=9.5 (9 minutes 30 seconds)

(3.1.3) In the above example, a display time of an image having a high priority is still set to 12 minutes which is a display time before an image is acquired, but may be further extended. For example, as in (3.1.2), in a case where, among the six images, there is a single image having a high priority, and there is a single image having a medium priority, display times of the images are respectively 14 minutes, 10 minutes, 9 minutes, 9 minutes, 9 minutes, and 9 minutes. The display times are calculated as follows.

A display time of the image having a medium priority is set to 10 minutes which is an average display time in a case of six images. A display time of the single image having a high priority is set to 14 minutes longer than 12 minutes which is a display time before the image is acquired. For example, with respect to the image having a high priority, a predefined time (for example, 2 minutes) may be added, or a predefined coefficient of 1 or greater may be multiplied. In other words, the display time is not shorter than a display time before a new image is acquired.

With respect to the four images having a low priority, a display time of each image is calculated according to the following computation.

(60−14−10)/4=9 (minutes)

Figures 3, 4:
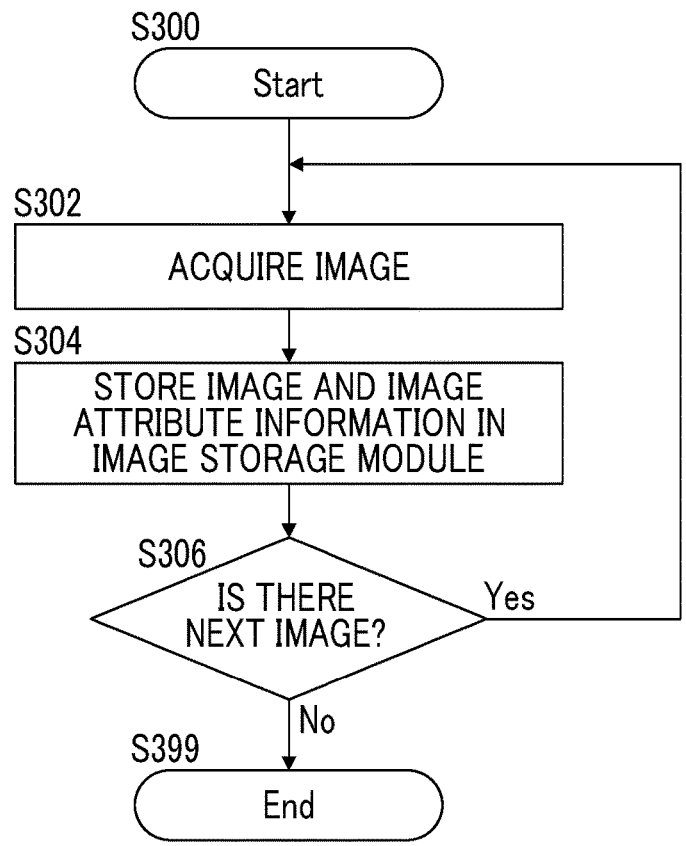
FIG. 3 is a flowchart illustrating a process example according to the present exemplary embodiment.
FIG. 4 is a diagram illustrating a data structure example of an image attribute information table.

FIG. 3 is a flowchart illustrating a process example according to the present exemplary embodiment (for example, the image acquisition module 110).

In step S302, an image is acquired.

In step S304, the image and image attribute information are stored in the image storage module 120. For example, an image attribute information table 400 is stored in the image storage module 120.

FIG. 4 is a diagram illustrating a data structure example of the image attribute information table 400. The image attribute information table 400 has an image ID field 410, an image name field 420, a size field 430, an acquisition date-and-time field 440, and a priority field 450. The image ID field 410 stores information (image identification: ID) for uniquely identifying an image in the present exemplary embodiment. The image name field 420 stores the name of the image. The size field 430 stores a size (for example, the number of vertical and horizontal pixels) of the image. The acquisition date-and-time field 440 stores the date and time (which may be year, month, day, hour, minute, second, second or less, or a combination thereof) at which the image is acquired. The priority field 450 stores a priority of the image. The priority may be set by a user, and may be determined according to a size or the like of a character as described above.

In step S306, it is determined whether or not there is the next image, and, in a case where there is the next image, the flow returns to step S302, and, in other cases, the process is finished (step S399).

Figure 5:
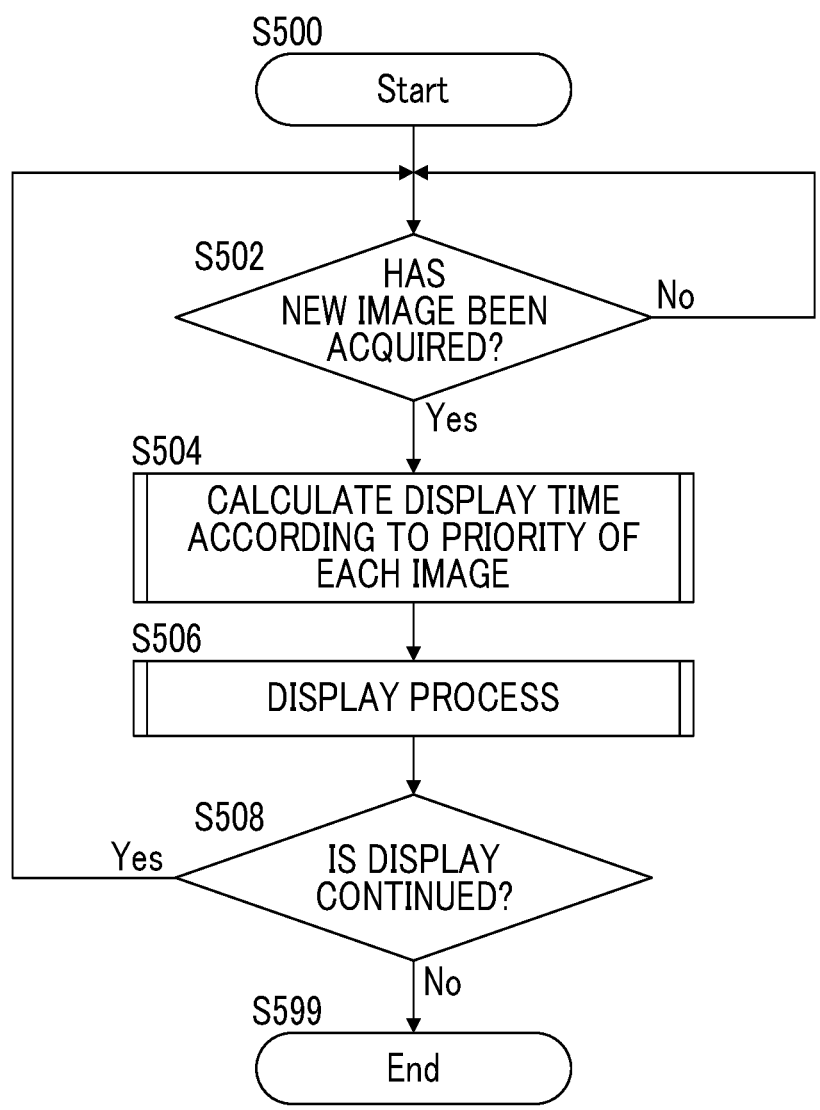
FIG. 5 is a flowchart illustrating a process example according to the present exemplary embodiment.

FIG. 5 is a flowchart illustrating a process example according to the present exemplary embodiment (for example, the display control module 130).

In step S502, it is determined whether or not a new image has been acquired, and, in a case where the new image has been acquired, the process proceeds to step S504, and, in other cases, waiting occurs until the new image is acquired.

In step S504, a display time is calculated according to a priority of each image. A detailed process in step S504 will be described later with reference to a flowchart illustrated in an example in FIG. 6.

In step S506, a display process is performed. A detailed process in step S506 will be described with reference to a flowchart in illustrated in an example in FIG. 8.

In step S508, it is determined whether or not the display is continuously performed, and, in a case where the display is continuously performed, the flow returns to step S502, and, in other cases, the process is finished (step S599).

Figure 6:
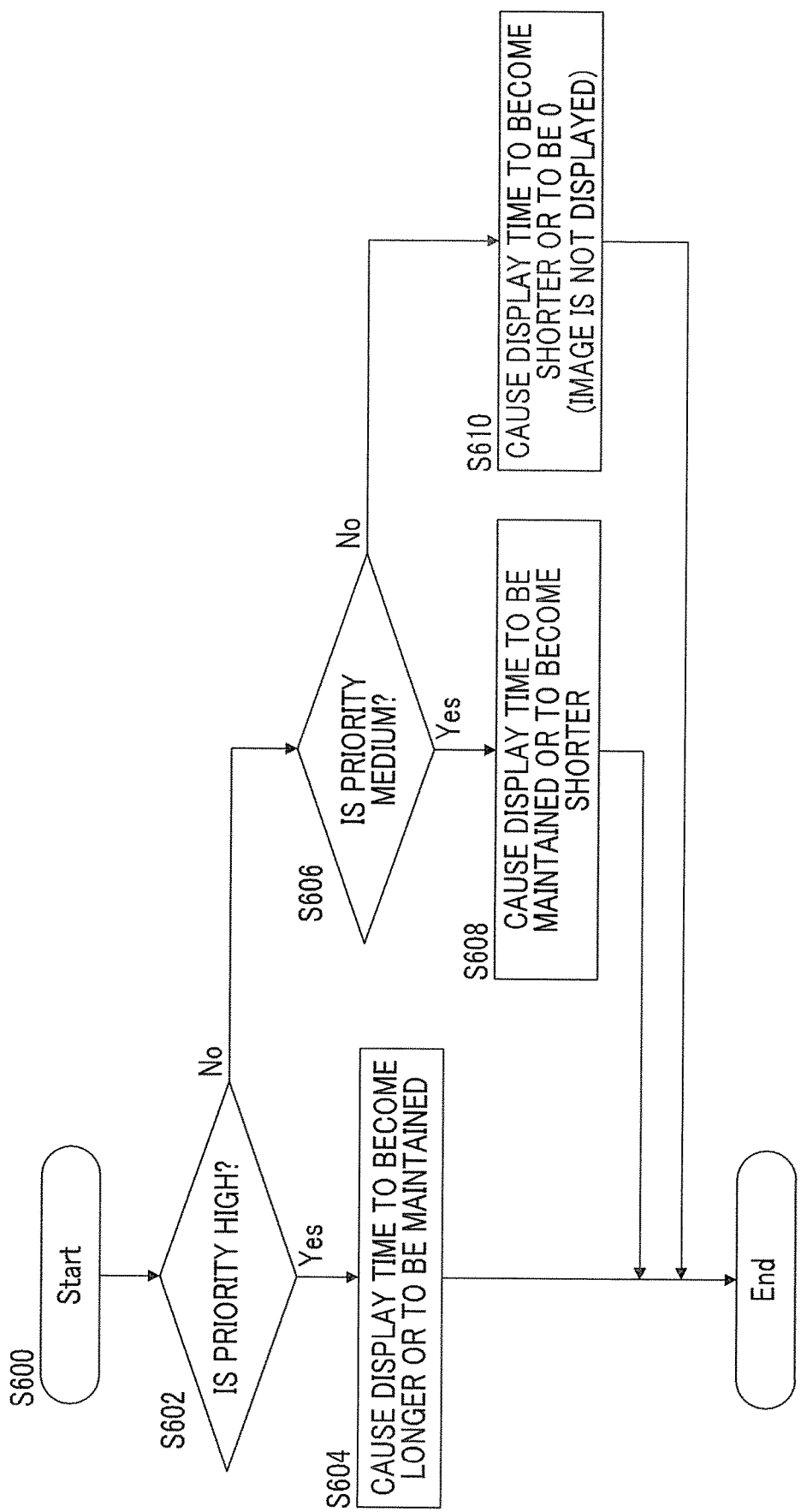
FIG. 6 is a flowchart illustrating a process example according to the present exemplary embodiment.

FIG. 6 is a flowchart illustrating a process example according to the present exemplary embodiment (for example, the display control module 130).

In step S602, it is determined whether or not a priority is "high", and, in a case where the priority is "high", the process proceeds to step S604, and, in other cases, the process proceeds to step S606.

In a case where the priority is compared with a predefined priority (threshold value), and is equal to or more than the threshold value, a determination result is "Yes", and, in a case where the priority is equal to or less than the threshold value, a determination result is "No".

Alternatively, in a case where priorities are sorted in a decreasing order, and the priority has a rank which is equal to or higher than a predefined rank A, a determination result is "Yes", and, in a case where the priority has a rank which is equal to or lower than the predefined rank A, a determination result is "No".

In step S604, a display time becomes longer or is maintained.

In step S606, it is determined whether or not the priority is "medium", and, in a case where the priority is "medium", the process proceeds to step S608, and, in other cases, the process proceeds to step S610.

In step S608, a display time is maintained or becomes shorter.

In step S610, a display time becomes shorter or is set to 0 (that is, an image is not displayed).

In the flowchart, a priority has three levels, but may have two levels or four or more levels.

Figures 7, 8:
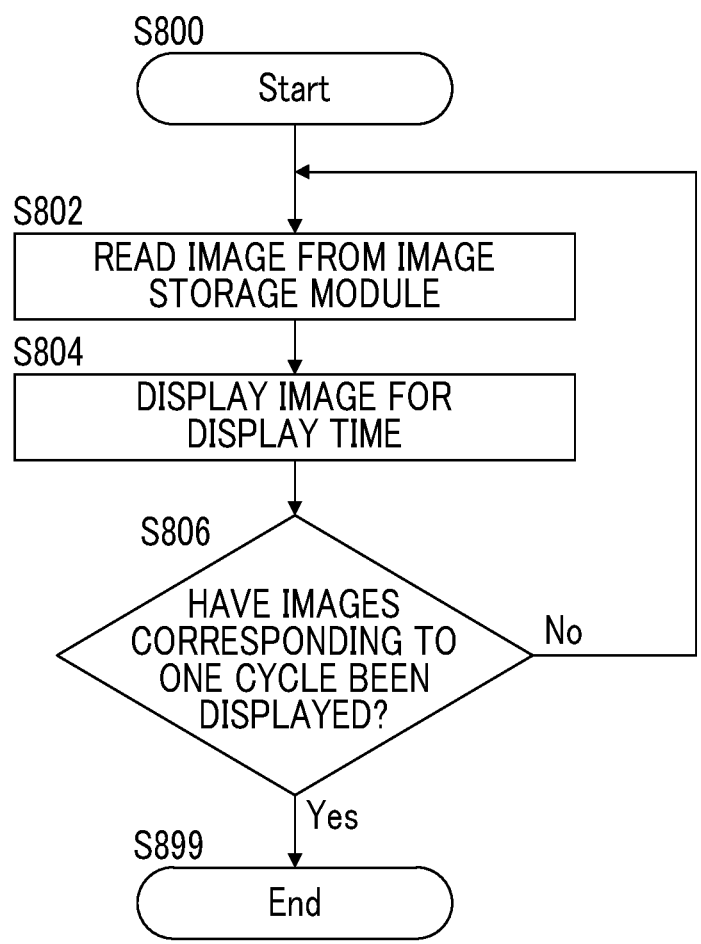
FIG. 7 is a diagram illustrating a data structure example of an image-display time table.
FIG. 8 is a flowchart illustrating a process example according to the present exemplary embodiment.

For example, an image-display time table 700 is generated through the process in the flowchart. FIG. 7 is a diagram illustrating a data structure example of the image-display time table 700. The image-display time table 700 has an image ID field 710, a priority field 720, and a display time field 730. The image ID field 710 stores an image ID. The priority field 720 stores a priority of the image. The display time field 730 stores a display time of the image.

FIG. 8 is a flowchart illustrating a process example according to the present exemplary embodiment (for example, the display control module 130).

In step S802, an image is extracted from the image storage module 120.

In step S804, the image is displayed for a display time.

In step S806, it is determined whether or not images corresponding to one cycle have been displayed, and, in a case where the images have been displayed, the process is finished (step S899), and, in other cases, the flow returns to step S802.

Figure 9:
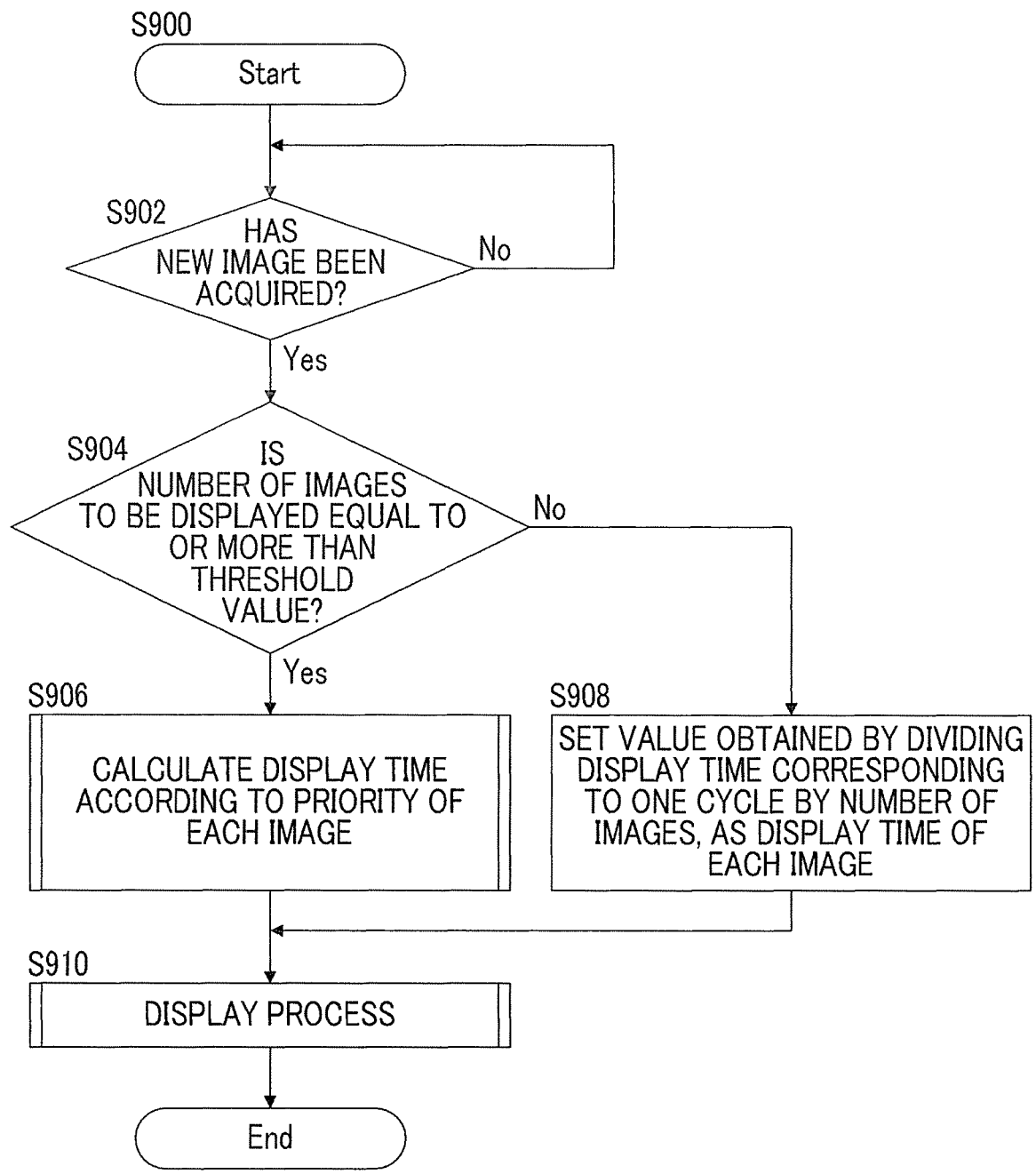
FIG. 9 is a flowchart illustrating a process example according to the present exemplary embodiment.

A process in a flowchart illustrated in an example in FIG. 9 may be performed instead of the process in the flowchart illustrated in an example in FIG. 5.

FIG. 9 is a flowchart illustrating a process example according to the present exemplary embodiment (for example, the display control module 130).

In step S902, it is determined whether or not a new image has been acquired, and, in a case where the new image has been acquired, the process proceeds to step S904, and, in other cases, waiting occurs until the new image is acquired.

In step S904, it is determined whether or not the number of images to be displayed is equal to or more than a threshold value, and, in a case where the number of images to be displayed is equal to or more than the threshold value, the process proceeds to step S906, and, in other cases, the process proceeds to step S908.

In step S906, a display time is calculated according to a priority of each image. A detailed process in step S906 will be described later with reference to a flowchart illustrated in an example in FIG. 10.

In step S908, a value obtained by dividing a display time corresponding to one cycle by the number of images is set as a display time of each image.

In step S910, a display process is performed. A detailed process in step S910 has been described with reference to a flowchart in illustrated in an example in FIG. 8.

Figure 10:
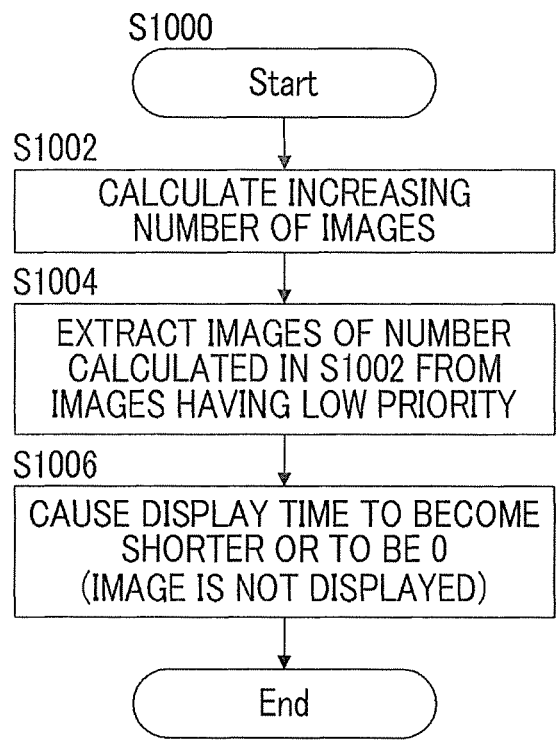
FIG. 10 is a flowchart illustrating a process example according to the present exemplary embodiment.

FIG. 10 is a flowchart illustrating a process example according to the present exemplary embodiment (for example, the display control module 130).

In step S1002, the number of images which is more than a threshold value is calculated.

In step S1004, images of the number calculated in step S1002 are extracted from images having a low priority.

In step S1006, a display time of an image having a low priority is set to become short or to 0 (that is, the image is not displayed).

Figure 11:
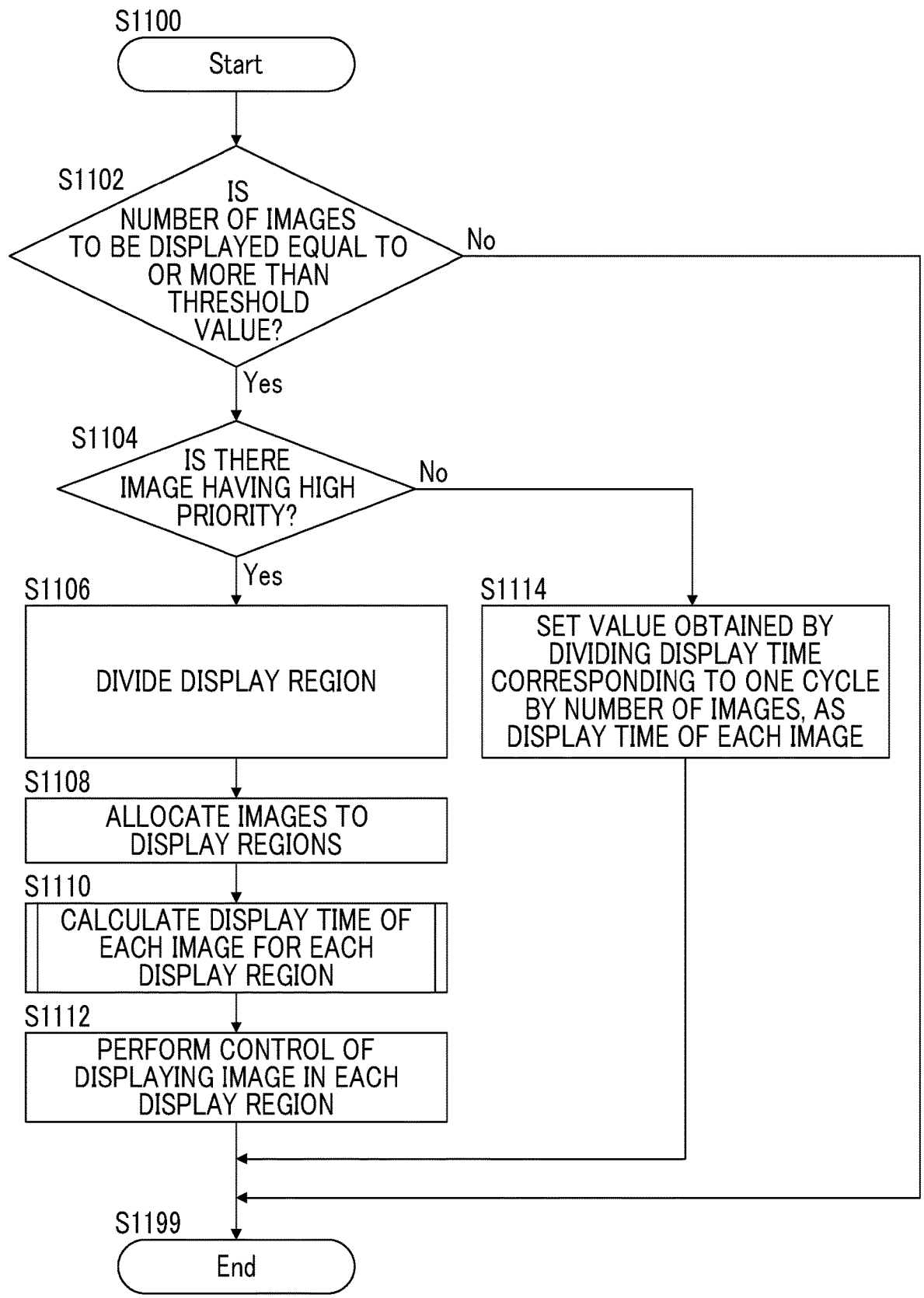
FIG. 11 is a flowchart illustrating a process example according to the present exemplary embodiment.

A process in a flowchart illustrated in an example in FIG. 11 maybe performed instead of the process in the flowchart illustrated in an example in FIG. 5 or 9.

FIG. 11 is a flowchart illustrating a process example according to the present exemplary embodiment (for example, the display control module 130).

Instep S1102, it is determined whether or not the number of images to be displayed is equal to or more than a threshold value, and, in a case where the number of images to be displayed is equal to or more than the threshold value, the process proceeds to step S1104, and, in other cases, the process is finished (step S1199).

In step S1104, it is determined whether or not there is an image having a high priority, and, in a case where there is an image having a high priority, the process proceeds to step S1106, and, in other cases, the process proceeds to step S1114.

Figure 12:
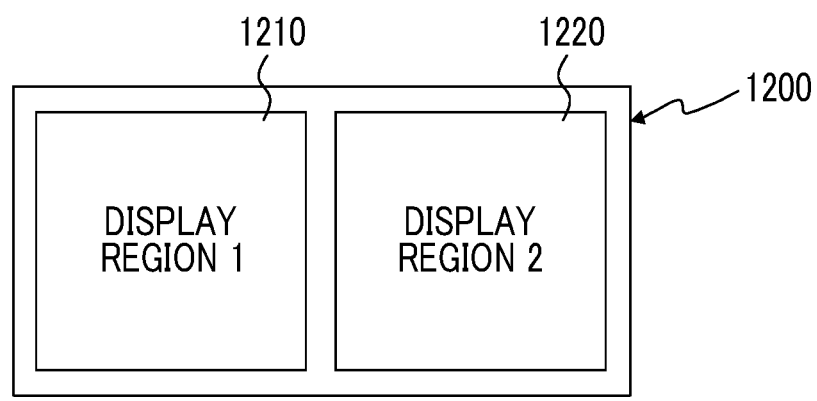
FIG. 12 is a diagram illustrating a screen division example according to the present exemplary embodiment.

In step S1106, a display region is divided into a plurality of regions. For example, the display region is divided as in a screen 1200 illustrated in FIG. 12. FIG. 12 is a diagram illustrating a screen division example according to the present exemplary embodiment.

The screen 1200 is divided into a display region 1: 1210 and a display region 2: 1220.

In step S1108, images are allocated to the display regions. In the example illustrated in FIG. 12, images are respectively allocated to the display region 1: 1210 and the display region 2: 1220. For example, an image having a high priority may be allocated to the left display region 1: 1210, and an image having a low priority may be allocated to the right display region 2: 1220. For example, an image which has a large number of characters or is desired to be thoroughly delivered may be set to have a high priority, and be displayed in the display region 1: 1210, and an image including a picture or old information may be set to have a low priority, and be displayed in the display region 2: 1220 in a relatively short cycle.

Instep S1110, a display time of each image is calculated for each display region. For example, the processes in the flowcharts illustrated in the examples in FIGS. 6 and 10 may be performed. For example, a display time in the display region 1: 1210 is set not to be reduced, and thus deterioration in an information delivery effect is prevented. Specifically, a display time of each image is set to be long in the display region 1: 1210, and a display time of each image is set to be short in the display region 2: 1220.

In step S1112, an image is controlled to be displayed in each display region.

In step S1114, there is no image having a high priority, and thus a value obtained by dividing a display time corresponding to one cycle by the number of images is set to a display time of each image.

Figure 13:
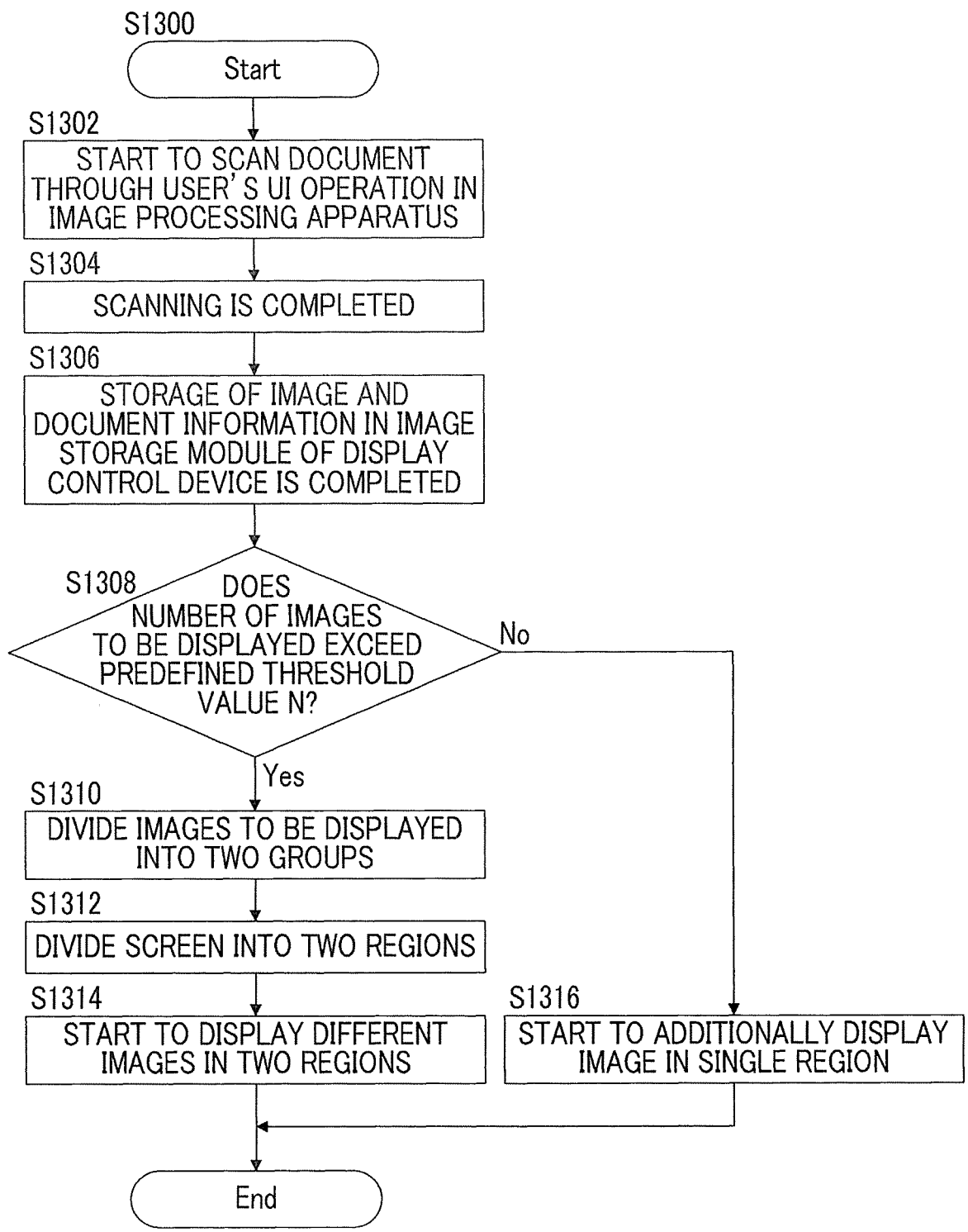
FIG. 13 is a flowchart illustrating a process example according to the present exemplary embodiment.

FIG. 13 is a flowchart illustrating a process example according to the present exemplary embodiment. As a specific example, a description will be made of an example in which the process is started from a document reading process performed by a user.

In step S1302, the document starts to be scanned through the user's UI operation in the image processing apparatus 210. Scanning is started not only through a UI operation but also through an operation on a physical key (including a hard key).

In step S1304, scanning is completed.

In step S1306, storage of an image and document information in the image storage module 120 of the display control device 100 is completed. The document information includes the image attribute information table 400. In addition to information of the image attribute information table 400, a register (user ID) may be added.

In step S1308, it is determined whether or not the number of images to be displayed exceeds a predefined threshold value N, and, in a case where the number of images to be displayed exceeds the threshold value N, the process proceeds to step S1310, and, in other cases, the process proceeds to step S1316. In other words, in a case where the number of registered images for display exceeds the threshold value N, a display screen is divided into a plurality of regions, and the images are displayed. For example, the threshold value N may be 36. The threshold value N "36" is a value supposed in a case where a single image is displayed once for 10 seconds, and is displayed at least ten times for an hour.

Here, the threshold value N is any value of which setting is changeable by using a signage controller.

In step S1310, the images to be displayed are divided into two groups. For example, grouping may be performed on the basis of a priority, and grouping may also be performed on the basis of old and new acquisition dates and times of images (a value in the acquisition date-and-time field 440 of the image attribute information table 400) or register information.

In step S1312, the screen is divided into two regions.

In step S1314, different images start to be displayed in the two regions. In other words, grouped images are sequentially displayed in the two separate regions. For example, the images are sequentially displayed every 10 seconds in a slide show manner.

In step S1316, an image starts to be additionally displayed in a single region.

Figure 14:
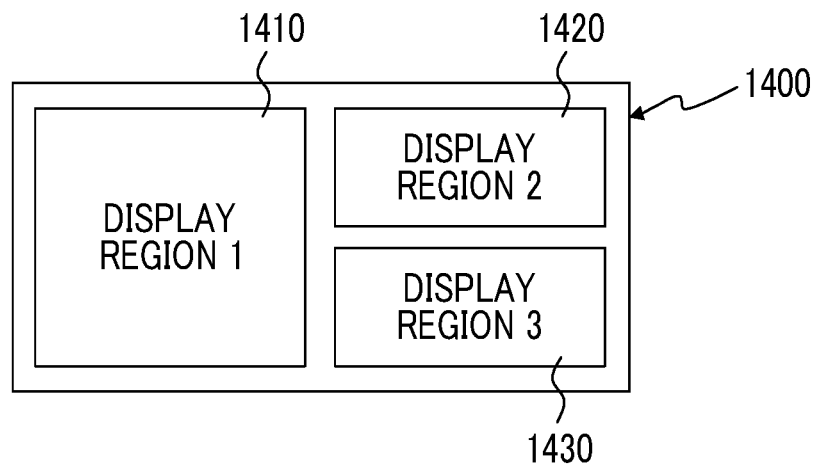
FIG. 14 is a diagram illustrating a screen division example according to the present exemplary embodiment.

FIG. 14 is a diagram illustrating a screen division example according to the present exemplary embodiment. FIG. 14 illustrates an example in which a screen 1400 is divided into three regions.

The screen 1400 is divided into a display region 1: 1410, a display region 2: 1420, and a display region 3: 1430.

In addition to grouping as in step S1310 in FIG. 13, control may be performed such that a longitudinally long original document (a so-called portrait type) is included in a group corresponding to the display region 1: 1410 on the basis of original document information (a vertical size and a horizontal size in the size field 430 of the image attribute information table 400). In a case where the longitudinally long original document is displayed in the display region 2: 1420 or the display region 3: 1430, the display region is transversely long (a so-called landscape type), and thus a size viewed by a user is reduced, so that an information delivery effect deteriorates. Therefore, a longitudinally long original document may be displayed in the display region 1: 1410, and a transversely long original document may be displayed in the display region 2: 1420 or the display region 3: 1430.

Through a picture region determination process (or a character region determination process) or a character recognition process, an image in which the number of characters is equal to or larger than a predefined number or an image in which a size of the character (small character) is equal to or smaller than a predefined size may be regarded to be an image having a high priority. A so-called busy image (for example, an image in which the number of characters is equal to or larger than a predefined number or an image of a detailed map) may be displayed in the largest region (for example, the display region 1: 1410 in FIG. 14) among separate regions. The image is displayed to be large, and thus deterioration in the information delivery effect is prevented.

Figure 15:
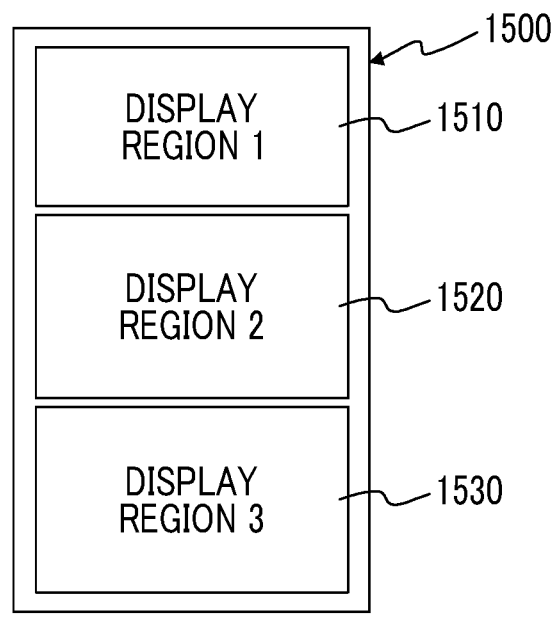
FIG. 15 is a diagram illustrating a screen division example according to the present exemplary embodiment.

FIG. 15 is a diagram illustrating a screen division example according to the present exemplary embodiment. A screen division method may be changed depending on whether or not a screen on which an image is displayed is longitudinally long or transversely long.

A longitudinally long screen 1500 is divided into a display region 1: 1510, a display region 2: 1520, and a display region 3: 1530. In a case of longitudinally long display, the screen is divided into three regions as illustrated in FIG. 15, and this shows a division example which is different from the example illustrated in FIG. 14. For example, an image having a high priority is displayed in the display region 1: 1510, an image having a medium priority is displayed in the display region 2: 1520, and an image having a low priority is displayed in the display region 3: 1530.

Figure 16:
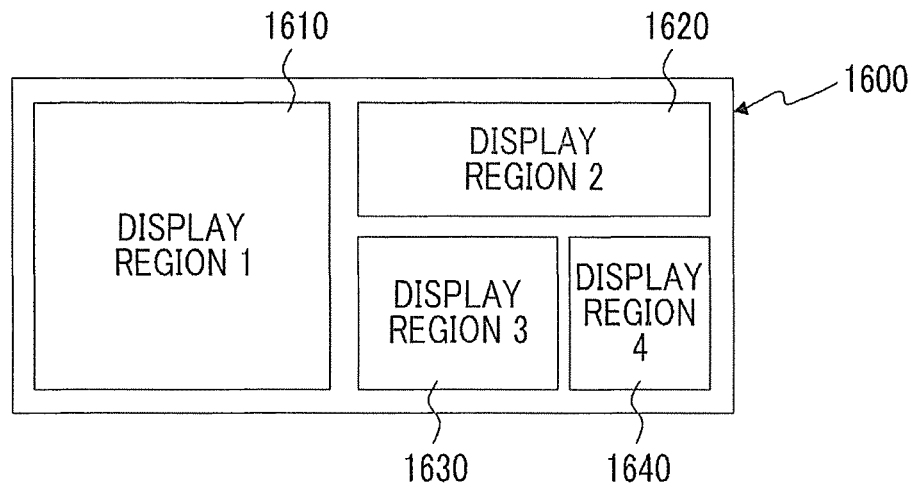
FIG. 16 is a diagram illustrating a screen division example according to the present exemplary embodiment.

FIG. 16 is a diagram illustrating a screen division example according to the present exemplary embodiment. Sizes of display regions may be different from each other.

A screen 1600 is divided into a display region 1: 1610, a display region 2: 1620, a display region 3: 1630, and a display region 4: 1640. Images having a higher priority may be respectively allocated to the display region 1: 1610, the display region 2: 1620, the display region 3: 1630, and the display region 4: 1640. Images having a high priority may be allocated to a plurality of display regions. A display region to which an image is allocated may be determined depending on whether the image is longitudinally long or transversely long. In the example illustrated in FIG. 16, longitudinally long images may be allocated to the display region 1: 1610 and the display region 4: 1640, and transversely long images may be allocated to the display region 2: 1620 and the display region 3: 1630.

Figure 17:
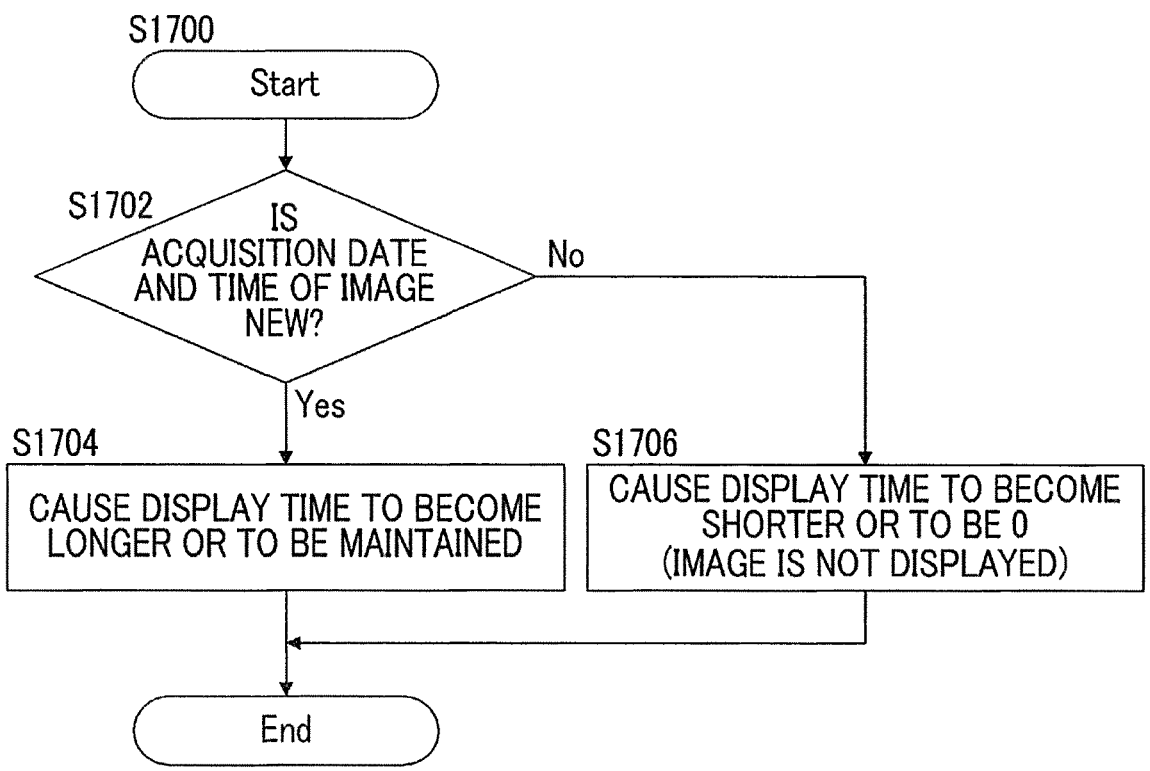
FIG. 17 is a flowchart illustrating a process example according to the present exemplary embodiment.

FIG. 17 is a flowchart illustrating a process example according to the present exemplary embodiment.

In step S1702, it is determined whether or not the acquisition date and time of an image is new, and, in a case where the acquisition date and time is new, the process proceeds to step S1704, and, in other cases, the process proceeds to step S1706. Regarding whether or not the acquisition date and time is new, in a case where the acquisition date and time is included in a predefined period from the current date and time, the acquisition date and time may be determined as being new, and, in a case where the acquisition data is not included in the period, the acquisition date and time may be determined as being old.

In step S1704, a display time becomes longer or is maintained. In other words, the image is handled as an image having a high priority.

In step S1706, a display time becomes shorter or is set to 0 (that is, an image is not displayed). In other words, the image is handled as an image having a low priority.

Figure 18:
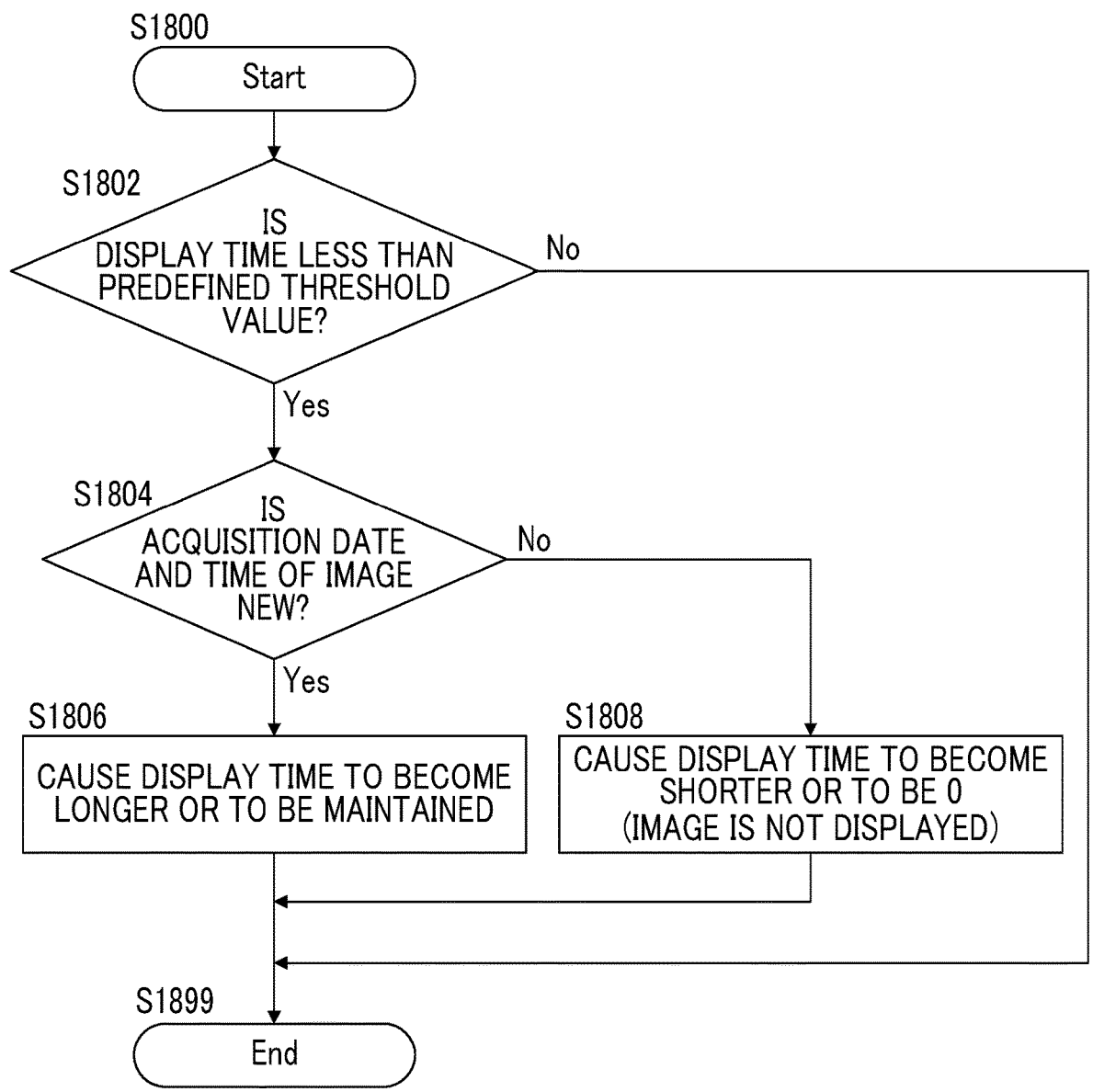
FIG. 18 is a flowchart illustrating a process example according to the present exemplary embodiment.

FIG. 18 is a flowchart illustrating a process example according to the present exemplary embodiment.

In step S1802, it is determined whether or not a display time of an image is less than a predefined threshold value, and, in a case where the display time is less than the threshold value, the process proceeds to step S1804, and, in other cases, the process is finished (step S1899). For example, in a case where the number of images to be displayed is increased, and thus a display time of an image is shortened, the process proceeds to step S1804.

In step S1804, it is determined whether or not the acquisition date and time of an image is new, and, in a case where the acquisition date and time is new, the process proceeds to step S1806, and, in other cases, the process proceeds to step S1808. A process equivalent to the process in step S1702 of the flowchart in the example illustrated in FIG. 17 is performed.

In step S1806, a display time becomes longer or is maintained.

In step S1808, a display time becomes shorter or is set to 0 (that is, an image is not displayed).

Figure 19:
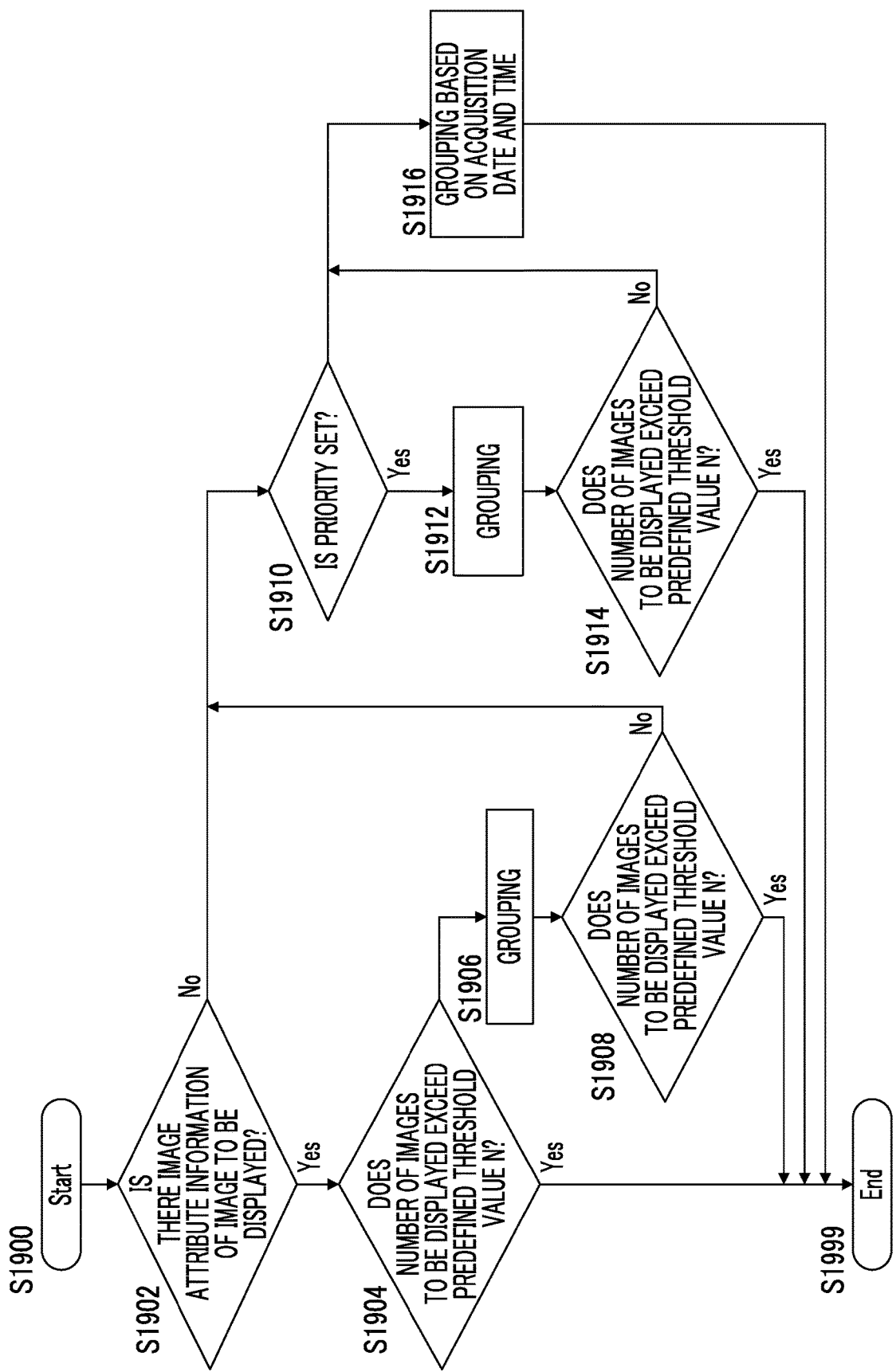
FIG. 19 is a flowchart illustrating a process example according to the present exemplary embodiment.

FIG. 19 is a flowchart illustrating a process example according to the present exemplary embodiment. As a specific example, an example is description in which a priority is determined, and grouping is performed.

In step S1902, it is determined whether or not there is image attribute information of an image to be displayed, and, in a case where there is the image attribute information, the process proceeds to step S1904, and, in other cases, the process proceeds to step S1910.

Instep S1904, it is determined whether or not the number of images to be displayed exceeds a predefined threshold value N, and, in a case where the number of images to be displayed does not exceed the threshold value N, the process is finished (step S1999), and, in other cases, the process proceeds to step S1906.

In step S1906, grouping is performed. For example, an image (an image having a high priority) to be displayed in the display region 1 is selected by using user information in image attribute information registered in the image storage module 120. Specifically, in a case where an image is registered through an operation of a manager, the image is grouped to be displayed in the display region 1 (that is, the image is grouped as an image having a high priority).

Instep S1908, it is determined whether or not the number of images to be displayed exceeds the predefined threshold value N, and, in a case where the number of images to be displayed does not exceed the threshold value N, the process is finished (step S1999), and, in other cases, the process proceeds to step S1910.

In step S1910, it is determined whether or not a priority is set, and, in a case where a priority is set, the process proceeds to step S1912, and, in other cases, the process proceeds to step S1916.

In step S1912, grouping is performed. The grouping is performed by using the priority.

In step S1914, it is determined whether or not the number of images to be displayed exceeds the predefined threshold value N, and, in a case where the number of images to be displayed does not exceed the threshold value N, the process is finished (step S1999), and, in other cases, the process proceeds to step S1916.

In step S1916, grouping is performed on the basis of the acquisition date and time. The grouping is performed depending on whether the acquisition date and time is new or old.

For example, an image having a high priority is displayed in the display region 1, so that a display time in the display region 1 is not shorter than a predefined value, and thus deterioration in an information delivery effect is prevented. An image having a low priority is displayed in the display region 2, a display time of an image is reduced in a case of exceeding the predefined value N, and thus all images can be displayed within one cycle in the display region 2. An image of which the acquisition date and time is old may not be displayed such that the number of images to be displayed is equal to or less than the predefined value N.

Figure 20:
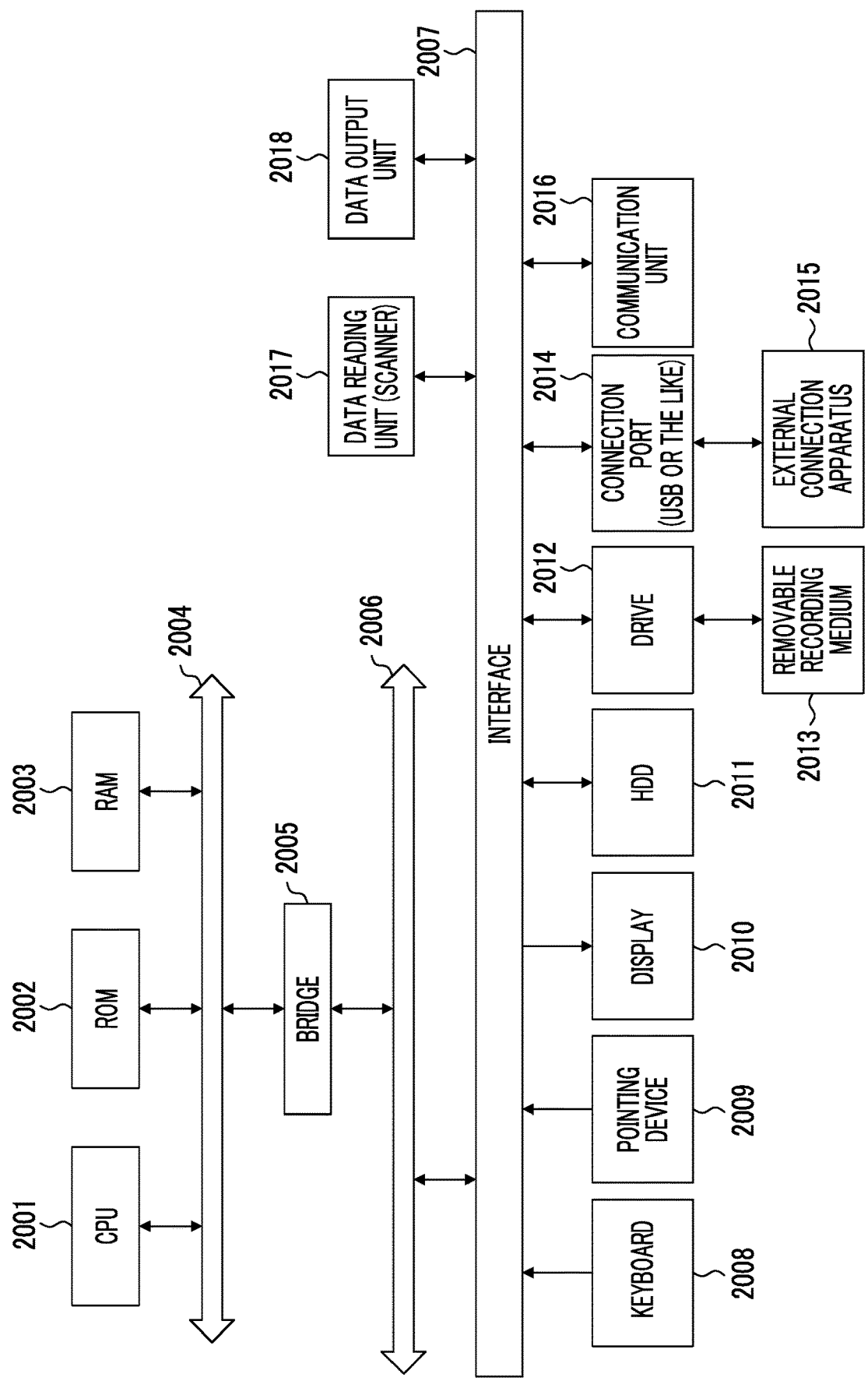
FIG. 20 is a block diagram illustrating a hardware configuration example of a computer realizing the present exemplary embodiment.

With reference to FIG. 20, a description will be made of a hardware configuration example of the display control device 100 according to the present exemplary embodiment. A configuration illustrated in FIG. 20 is realized by, for example, a personal computer (PC), and corresponds to a hardware configuration example including a data reading unit 2017 such as a scanner, and a data output unit 2018 such as a printer.

A central processing unit (CPU) 2001 is a control unit which performs a process according to a computer program in which an execution order of the respective modules such as the various modules described in the exemplary embodiment, that is, the image acquisition module 110 and the display control module 130.

A read only memory (ROM) 2002 stores a program, a calculation parameter, or the like used by the CPU 2001. A random access memory (RAM) 2003 stores a program used for execution of the CPU 2001, a parameter which changes as appropriate in the execution, or the like. The above-described elements are connected to each other via a host bus 2004 configured with a CPU bus or the like.

The host bus 2004 is connected to an external bus 2006 such as a Peripheral Component Interconnect/Interface (PCI) bus via a bridge 2005.

A keyboard 2008 and a pointing device 2009 such as a mouse are devices operated by an operator. A display 2010 includes a liquid crystal display or a cathode ray tube (CRT), and displays various pieces of information as text or image information. A touch screen or the like having both functions of the pointing device 2009 and the display 2010 may be used. In this case, regarding of realization of a function of a keyboard, the function of the keyboard may be realized by drawing a keyboard (a so-called software keyboard or a screen keyboard) on a screen by using software even without physical connection as in the keyboard 2008.

A hard disk drive (HDD) 2011 has a hard disk (which may be a flash memory or the like) built thereinto, and drives the hard disk, so as to record or reproduce a program executed by the CPU 2001 or information. The hard disk realizes a function as the image storage module 120 or the like. Other various pieces of data, various computer programs, and the like are stored.

A drive 2012 reads data or a program recorded on a magnetic disk, an optical disc, a magnetooptical disc, or a removable recording medium 2013 such as a semiconductor memory, installed therein, and supplies the data or the program to the RAM 2003 via an interface 2007, the external bus 2006, the bridge 2005, and the host bus 2004. The removable recording medium 2013 may also be used as a data recording region.

A connection port 2014 is a port for connection to an external connection apparatus 2015, and has a connection portion such as the USB or IEEE1394. The connection port 2014 is connected to the CPU 2001 or the like via the interface 2007, the external bus 2006, the bridge 2005, and the host bus 2004. A communication unit 2016 is connected to a communication line, and performs a data communication process with an external apparatus. The data reading unit 2017 is, for example, a scanner, and performs a document reading process. The data output unit 2018 is, for example, a printer, and performs a document data output process.

The hardware configuration of the display control device 100 illustrated in FIG. 20 corresponds to one configuration example, and the present exemplary embodiment is not limited to the configuration illustrated in FIG. 20, and any configuration in which the modules described in the present exemplary embodiment can be executed may be used. For example, some of the modules may be configured with dedicated hardware (for example, an application specific integrated circuit (ASIC) or a field-programmable gate array (FPGA)), some of the modules may be provided in an external system, and may be connected to a communication line, and such a plurality of systems illustrated in FIG. 20 may be connected to each other via a communication line so as to operate in cooperation therebetween. Particularly, the modules may be incorporated not only into a personal computer but also into a portable information communication apparatus (including a mobile phone, a smart phone, a mobile apparatus, a wearable computer, and the like), an information appliance, a robot, a copier, a facsimile, a scanner, a printer, a multi-function peripheral.

In the comparison process in the description of the exemplary embodiment, "equal to or more than", "equal to or less than", "more than (exceeding)", and "less than" may be respectively replaced with "more than", "less than", "equal to or more than", and "equal to or less than" unless a contradiction occurs in a combination thereof.

The program may be stored on a recording medium so as to be provided, and the program may be provided by using a communication unit. In this case, for example, the program may be understood as the invention of a "non-transitory computer readable medium storing the program".

The "non-transitory computer readable medium storing the program" indicates a computer readable recording medium storing the program, used to install, execute, and distribute the program.

The recording medium includes, for example, "a DVD-R, a DVD-RW, a DVD-RAM, or the like" which is a digital versatile disc (DVD) and is a standard defined in the DVD forum, and "a DVD+R, DVD+RW, or the like" which is a standard defined in the DVD+RW, a compact disc (CD) read only memory (CD-ROM), a CD recordable (CD-R), or a CD rewritable (CD-RW), a Blu-ray (registered trademark) disc, a magnetooptical disc (MO), a flexible disk (FD), a magnetic tape, a hard disk, a read only memory (ROM), an electrically erasable programmable read only memory (EEPROM) (registered trademark), a flash memory, a random access memory (RAM), and a secure digital (SD) memory card.

The whole or a part of the program may be recorded on the recording medium so as to be preserved or distributed. The program may be transmitted through communication, for example, by using a transmission medium such as a wired network used for a local area network (LAN), a metropolitan area network (MAN), a wide area network (WAN), the Internet, an intranet, or an extranet, a wireless communication network, or a combination thereof, and may be carried via a carrier wave mounted therewith.

The program may be a part or the whole of another program, or may be recorded on a recording medium along with a separate program. The program may be divided and recorded on a plurality of recording media. The program may be recorded in any restorable aspect such as compression or encryption.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display control device comprising:
an image sensor that acquires an image;
a storage device that stores a plurality of mages acquired by the image sensor; and
a central processing unit (CPU) that controls each image stored in the storage device to be displayed sequentially on a display device during a fixed time, and performs control of changing a time for which each of an acquired new image and the plurality of images stored in the storage device is displayed on the display device according to a display priority of each image in a case where the image sensor acquires the image.

2. The display control device according to claim 1,
wherein the central processing unit (CPU) performs control such that an image having a high priority is displayed on the display device for a time which is not shorter than an average display time after a new image is acquired in a case where the image sensor acquires the image.

3. The display control device according to claim 2,
wherein the central processing unit (CPU) performs control such that the image having a high priority is displayed on the display device for a time which is not shorter than a display time before the new image is acquired.

4. The display control device according to claim 1,
wherein the central processing unit (CPU) performs control such that an image having a low priority is displayed on the display device for a time which is not longer than an average display time after a new image is acquired.

5. The display control device according to claim 4,
wherein the control of a display time in the display device, performed by the central processing unit (CPU), includes control of not displaying an image.

6. The display control device according to claim 1,
wherein, in a case where the number of images stored in the storage device is equal to or larger than a predefined number, the central processing unit (CPU) performs control of changing a time for which each of an acquired new image and the plurality of images stored in the storage device is displayed on the display device according to a display priority of each image.

7. The display control device according to claim 6,
wherein the central processing unit (CPU) performs control of reducing a display time by the number of images exceeding the predefined number according to the display priority of each image.

8. The display control device according to claim 7,
wherein the central processing unit (CPU) performs control such that images of the number exceeding the predefined number are not displayed according to the display priority of each image.

9. The display control device according to claim 1,
wherein, in a case where the image sensor acquires an image, the central processing unit (CPU) displays the acquired new image and the plurality of images stored in the storage device in separate display regions according to a display priority of each image.

10. The display control device according to claim 9,
wherein the central processing unit (CPU) determines a size of a region in which an image is displayed according to the display priority of each image.

11. The display control device according to claim 9,
wherein the central processing unit (CPU) controls the number of separate regions displayed in a display region according to the display priority of each image.

12. A non-transitory computer readable medium storing a display control program causing a computer to function as:
an image sensor that acquires an image;
a storage device that stores a plurality of images acquired by the image sensor; and
a central processing unit (CPU) that controls each image stored in the storage device to be displayed sequentially on a display device during a fixed time, and performs control of changing a time for which each of an acquired new image and the plurality of images stored in the storage device is displayed on the display device according to a display priority of each image in a case where the image sensor acquires the image.

13. A display control device comprising:
acquisition means for acquiring an image;
storage means for storing a plurality of images acquired by the image sensor; and
display control means for controlling each image stored in the storage device to be displayed sequentially on a display device during a fixed time, and performing control of changing a time for which each of an acquired new image and the plurality of images stored in the storage device is displayed on the display device according to a display priority of each image in a case where the image sensor acquires the image.

* * * * *